United States Patent [19]

Nakano et al.

[11] Patent Number: 4,533,963

[45] Date of Patent: Aug. 6, 1985

[54] VIDEO TAPE RECORDER FOR RE-RECORDING AUDIO SIGNALS

[75] Inventors: Kenji Nakano, Ebina; Takao Takahashi, Sagamihara; Hisayoshi Moriwaki, Isehara; Keiichiro Shimada, Fujisawa, all of Japan

[73] Assignee: Sony Corporation, Tokyo, Japan

[21] Appl. No.: 460,390

[22] Filed: Jan. 24, 1983

[30] Foreign Application Priority Data

Jan. 25, 1982 [JP] Japan ................... 57-9850

[51] Int. Cl.³ ................. G11B 27/02; G11B 5/49
[52] U.S. Cl. ............. 360/19.1; 360/21; 360/33.1; 360/14.1; 358/343
[58] Field of Search ........ 360/19.1, 21, 14.1, 360/33.1; 358/340, 343

[56] References Cited

U.S. PATENT DOCUMENTS 4,303,950 12/1981 Taniguchi et al. ............ 360/19.1
4,351,007 9/1982 Youngquist ................... 360/13
4,363,049 12/1982 Ohtsuki et al. ................ 360/13

Primary Examiner—Raymond F. Cardillo, Jr.
Assistant Examiner—Alan K. Aldous
Attorney, Agent, or Firm—Lewis H. Eslinger; Alvin Sinderbrand

[57] ABSTRACT

In a magnetic recording and/or reproducing apparatus of the kind in which the azimuth angles of recorded signals in adjacent tracks on a magnetic recording medium are made different with each other so as not to require a guard band and having a rotary head assembly including at least a pair of magnetic transducing heads, each having the head width larger than the track width, when a portion of an audio signal on the magnetic medium is re-recording, an identification information signal is recorded on a predetermined track in connection with the first or last track for which the re-recording is required so that signal deterioration and noise caused by track width fluctuation or variation is compensated for.

9 Claims, 14 Drawing Figures

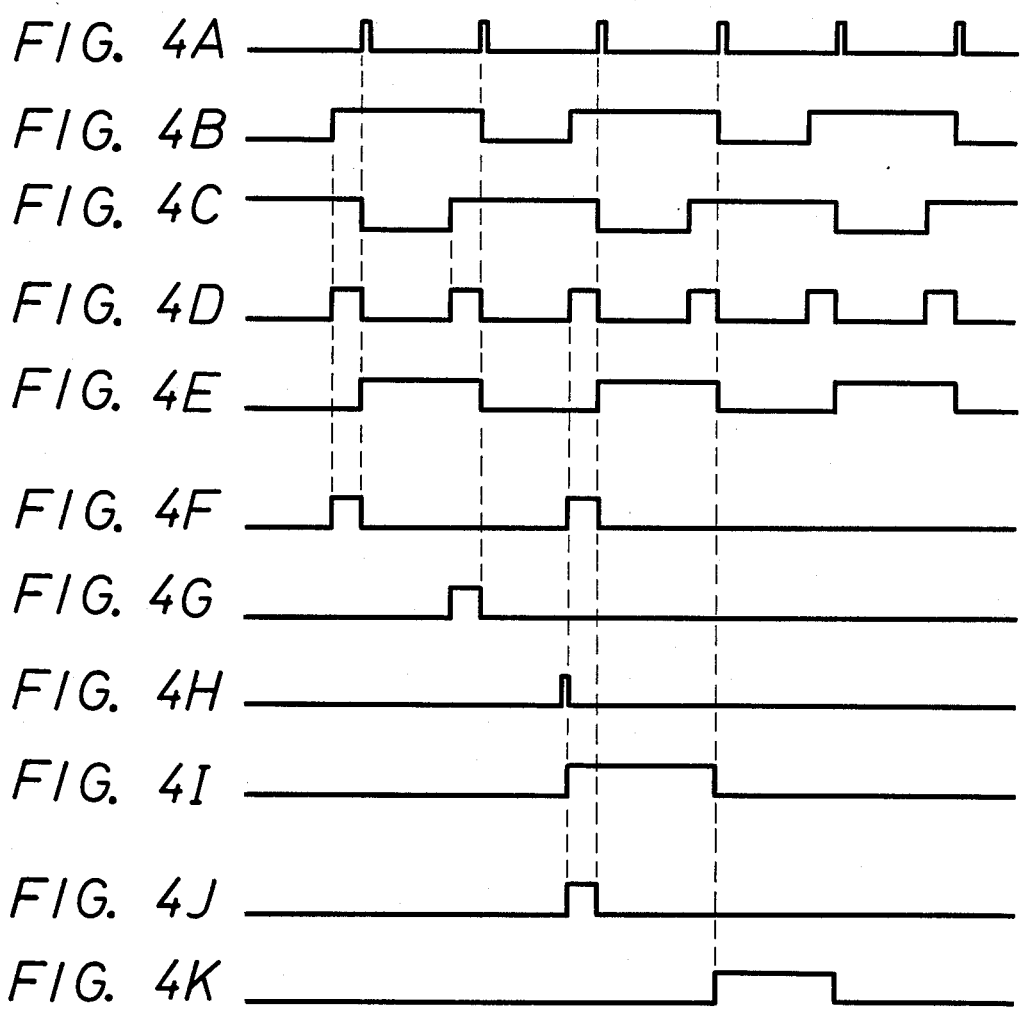

VIDEO TAPE RECORDER FOR RE-RECORDING AUDIO SIGNALS

BACKGROUND OF THE INVENTION

1. Field of the Invention

The present invention relates generally to a recording and/or reproducing apparatus and is directed more particularly to a magnetic recording and/or reproducing apparatus having at least a pair of rotary magnetic transducing heads.

2. Description of the Prior Art

In a so-called helical scan type video tape recorder (VTR), there has been proposed such an apparatus in which the azimuth angles of recorded signals are made different with each other between adjacent tracks to omit a guard band and magnetic transducing heads each having the head width larger than the track width are used to perform the recording and/or reproducing.

In connection with the above apparatus, it is proposed that the wrapping angle of a magnetic tape around a rotary drum is selected larger than the angular distance or rate of the heads to provide an overlap interval in which plural heads contact with the tape at the same time and an audio signal, which is, for example, a pulse-code-modulated (PCM) signal and is time-base-compressed, is recorded on the tape during the above overlap interval.

FIG. 1 is a tape format showing a recorded track pattern on a magnetic tape by the manner mentioned just above. In FIG. 1, the track is sequentially formed on the tape from the left side of the sheet of the drawing and each track is recorded from the lower side of the tape to its upper side. In FIG. 1, on the portion with hatches recorded is a PCM audio signal and on the portion with no hatch recorded is a video signal, respectively.

Upon the recording mode, the portion or region of each track shown by the solid and broken line in FIG. 1 is magnetized by the recording signal and when a next track is recorded, a part of the former track is erased by the recording of a next signal so that the regions shown by the solid lines are made as recorded tracks, respectively.

With the above apparatus, it is possible that only the PCM audio signal, by way of example, is re-recorded on the tape which is once recorded so as to perform a so-called after recording. In such a case, for example, the rotary phase of the rotary heads is detected by a pulse generator and so on as well as the above-mentioned overlap portion is discriminated or identified and then a PCM audio signal is supplied to the heads and recorded thereby during the interval in which the heads contact with the overlap portion of the tape. Consequently, by this recording the PCM audio signal which was already recorded is erased and the new PCM audio signal is recorded.

In case of this recording, when the PCM audio signals on, for example, tracks $a_7$ to $a_{12}$ in FIG. 1 are re-recorded to be tracks $b_7$ to $b_{12}$ as shown in FIG. 2, a part of the next track $a_{13}$ is erased by the track $b_{12}$ recorded last and hence the width of the track $a_{13}$ becomes very narrow. In other words, upon the normal recording a part of the track $b_{12}$ which is to be erased by the recording of the next track $a_{13}$ is not erased and hence the width of the track $a_{13}$ becomes narrower by that amount.

Further, there may be such a case that if the relative position of the head to the first track $b_7$ on which the re-recording is carried out is not correct, the former track $a_6$ is erased too much by the recording of the track $b_7$ as compared with the case of the correct position and hence the width of the track $a_6$ becomes narrow.

As the track width of the PCM audio signal portion becomes narrower as set forth above, a reproduced signal therefrom is deteriorated, an error is caused upon the PCM demodulation and accordingly noise is generated.

OBJECTS AND SUMMARY OF THE INVENTION

Accordingly, an object of the present invention is to provide a recording and/or reproducing apparatus free from the defects encountered in the prior art.

Another object of the invention is to provide a magnetic recording and/or reproducing apparatus which can avoid the generation of noise upon reproduction of a recorded signal.

According to an aspect of the present invention there is provided a magnetic recording and/or reproducing apparatus having at least a pair of rotary magnetic transducing heads for producing information tracks on a magnetic recording medium, each of said information tracks comprising a video signal track portion and an audio signal track portion, azimuth angles of said transducing heads being different to each other and a width of said transducing heads being larger than that of said information tracks, comprising:
 (a) means for re-recording an audio signal,
 (b) means for generating an identification (ID) signal for identifying re-recorded tracks,
 (c) means for recording said ID signal in a predetermined position of said magnetic recording medium,
 (d) means for detecting said ID signal, and
 (e) means for compensating a reproduced audio signal identified with said ID signal.

The other objects, features and advantages of the present invention will become apparent from the following description taken in conjunction with the accompanying drawings through which the like references designate the same elements and parts.

BRIEF DESCRIPTION OF THE DRAWINGS

FIGS. 4A to 4K are respectively time charts used to explain the operation of the example of the invention shown in FIG. 3.

DESCRIPTION OF THE PREFERRED EMBODIMENT

The present invention will be hereinafter described with reference to the attached drawings.

Figure 3:
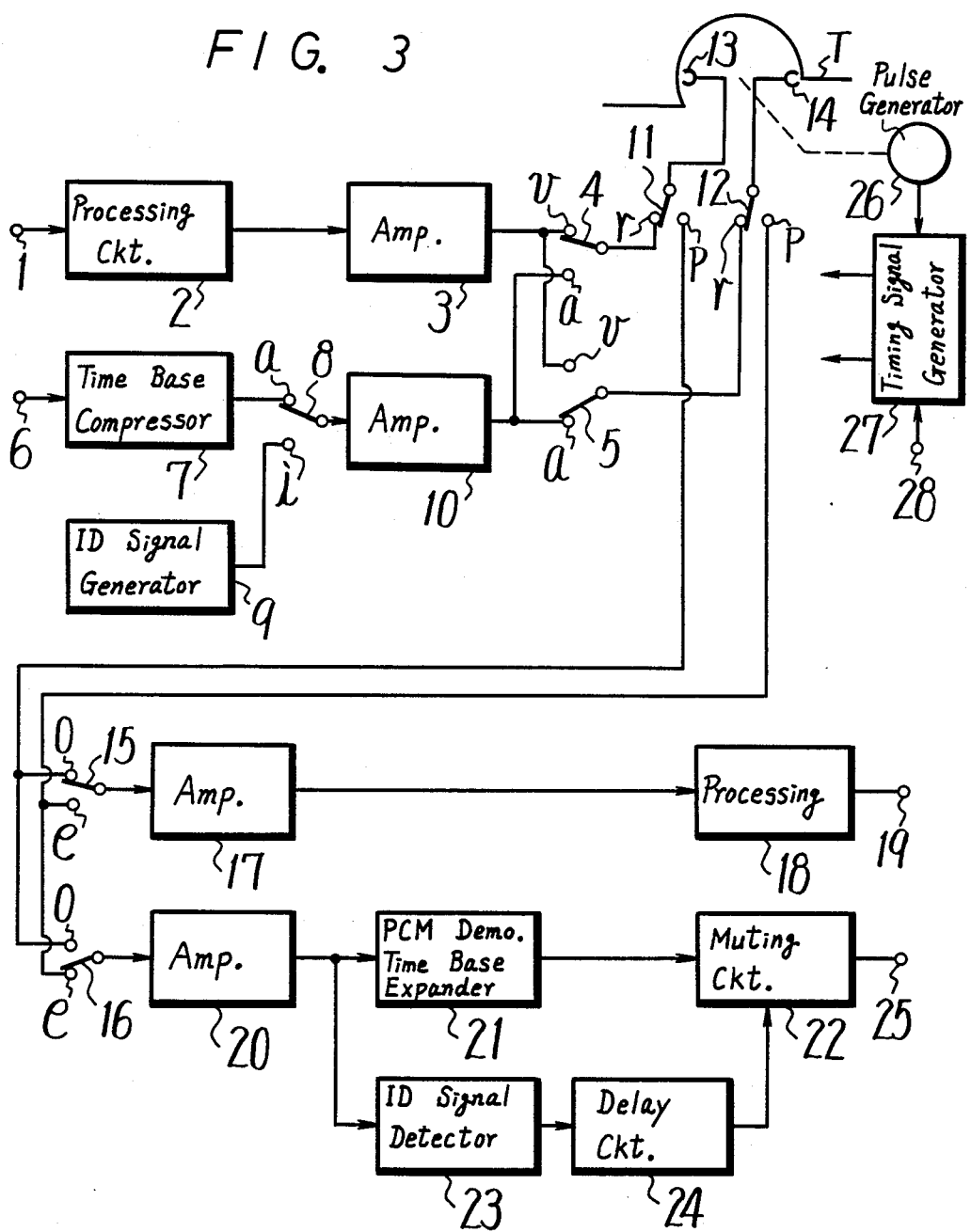
FIG. 3 is a systematic block diagram showing an example of the magnetic recording and/or reproducing apparatus according to the present invention.

FIG. 3 shows an embodiment of the magnetic recording and/or reproducing apparatus according to this invention. In FIG. 3, reference numeral 1 is an input terminal to which a video signal to be recorded is applied. This video signal is then supplied through a processing circuit 2 and an amplifier 3 to switches 4 and 5 at one fixed contacts v thereof. While, an input terminal 6 is supplied with an audio signal to be recorded and this audio signal is fed through a PCM (pulse code modulation) time base compressing circuit or compressor 7 to a switch 8 at its one fixed contact a. Further, an ID (identification) signal from an ID signal generating circuit or generator 9 is fed to another fixed contact i of the switch 8. The signal obtained at a movable contact of the switch 8 is fed through an amplifier 10 to other fixed contacts a of the respective switches 4 and 5.

The signals appearing at movable contacts of the switches 4 and 5 are respectively supplied to recording side fixed contacts r of switches 11 and 12, and the signals obtained at movable contacts of the switches 11 and 12 are respectively supplied to magnetic transducing head 13 and 14 of a rotary head assembly and then recorded on a recording medium such as magnetic tape T.

In this case, the heads 13 and 14 are located at an angular distance or rate of 180° and the tape T is wrapped on a rotary drum over an angular range of 220°. The transportation servo of the tape T and the rotary servo of the heads 13 and 14 are carried out by the well-known method based upon a CTL (control) signal (not shown), the output signal from a pulse generator, which will be described later, and so on.

Reproduced signals from the tape T by the heads 13 and 14 are respectively delivered through the movable contacts of the switches 11 and 12 to their reproducing side fixed contacts p.

The reproduced signals delivered to the contacts p of the switches 11 and 12 are respectively supplied to fixed contacts o and e of switches 15 and 16. The signal appearing at a movable contact of the switch 15 is delivered through an amplifier 17 and a processing circuit 18 to an output terminal 19. While, the signal appearing at a movable contact of the switch 16 is fed through amplifier 20 to a PCM demodulation time base expanding circuit 21 and the demodulated audio signal therefrom is supplied to a muting circuit 22. The signal from the amplifier 20 is also fed to an ID signal detecting circuit 23 and the detected ID signal thereby is supplied through a delay circuit 24 with a predetermined delay time to the muting circuit 22. The output signal from the muting circuit 22 is delivered to an audio signal output terminal 25.

In the example of the invention shown in FIG. 3, there is provided a pulse generating circuit or generator 26 for detecting the rotary phases of the heads 13 and 14. The pulse signal from the pulse generating circuit 26 is fed to a timing signal generating circuit 27 and the timing signals therefrom are utilized to control the switching operations of the switches 4, 5 and so on.

FIGS. 4A to 4K are time charts of the apparatus shown in FIG. 3. Upon the normal recording mode, a pulse shown in FIG. 4A is produced from the pulse generating circuit 26. In this case, it can be assumed that the timing of the pulse shown in FIG. 4A is coincident with, for example, the vertical synchronizing period of the video signal. For this timing the heads 13 and 14 are respectively contacted with the tape T over ranges shown in FIGS. 4B and 4C. While, the PCM time base compressing circuit 7 is driven at the timing shown in FIG. 4D and a PCM audio signal corresponding to one vertical period before the driving thereof is derived therefrom. The switches 4 and 5 are changed over in opposite phase with each other at the timing shown in FIG. 4E, and the switches 11 and 12 are respectively changed over to their fixed contacts r.

Figure 1:
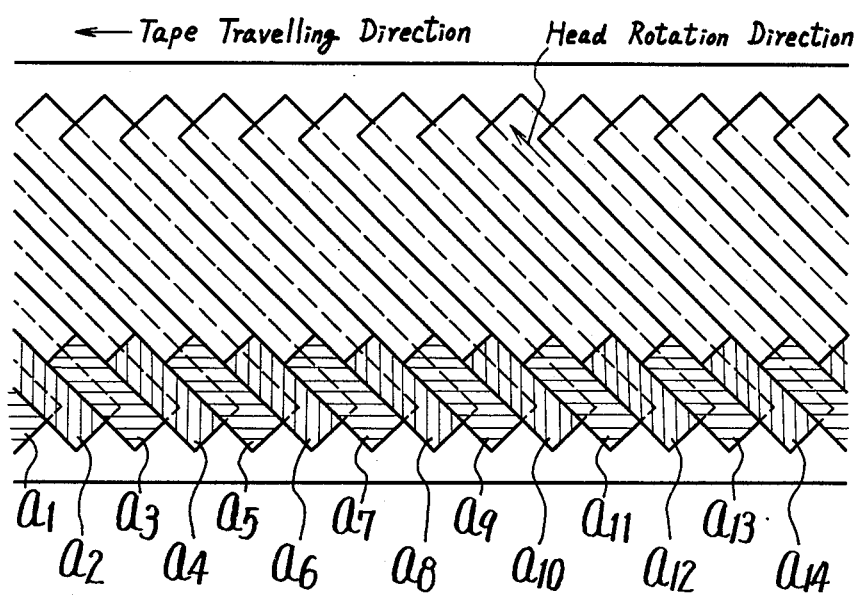
FIGS. 1 and 2 are respectively tape formats used to explain the present invention.

Accordingly, the head 13, by way of example, is supplied with the PCM audio signal through the contact a of the switch 4 during the first overlap period in which the head 13 contacts with the tape T and supplied with the video signal through the contact v of the switch 4 during the subsequent one vertical period, so that a desired track shown in FIG. 1 is formed on the tape T. Similarly, the next track is formed on the tape T by the head 14.

While, upon the normal reproducing mode, the switches 11 and 12 are respectively changed over to their contacts p. Further, the switches 15 and 16 are respectively changed over at the timing shown in FIG. 4E. Thus, from the switch 15 alternately derived are the reproduced video signals by the heads 13 and 14, while from the switch 16 derived is the PCM audio signal sequentially. These signals are respectively processed and demodulated and then delivered to the output terminals 19 and 25.

When a PCM audio signal is re-recorded, the switches 11 and 12 are respectively changed over to their contacts r during only the periods shown in FIGS. 4F and 4G. Therefore, a new PCM audio signal is fed to the heads 13 and 14 and then re-recorded on the tape T.

With the apparatus shown in FIG. 3, a timing signal representing the termination of the re-recording as shown in FIG. 4H is applied through a terminal 28 to the timing signal generating circuit 27. Thus, the switch 8 is changed over to its contact i by the timing signal from the generating circuit 27 during the interval shown in FIG. 4I.

Figure 2:
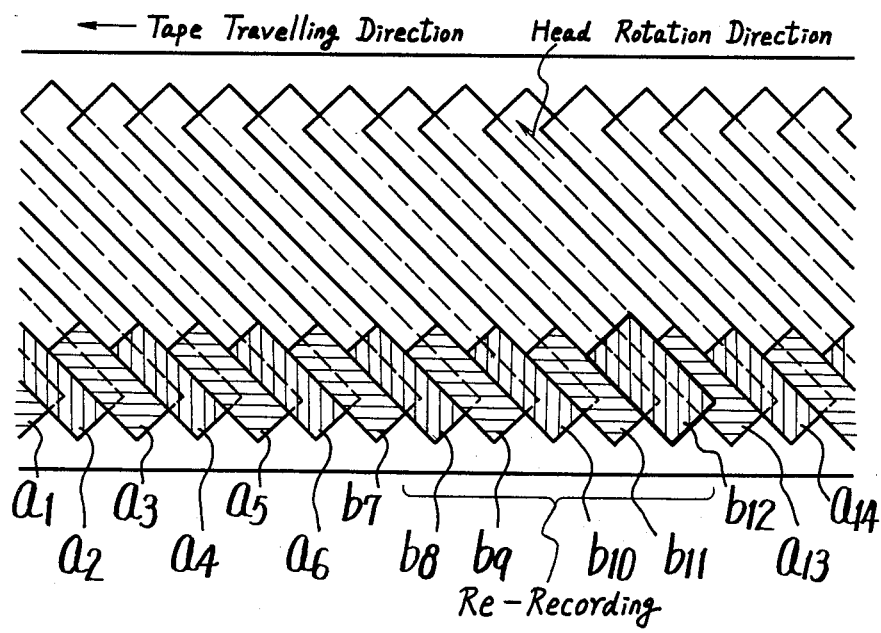

Accordingly, at the time when the track $b_{12}$ shown in FIG. 2 is re-recorded in place of the PCM audio signal the ID signal delivered from the ID signal generating circuit 9 is recorded on the track $b_{12}$ in the area with hatches. In this case, it be assumed that the ID signal is such a specific signal which can not be PCM-demodulated.

As set forth above, the re-recording of the PCM audio signal is performed.

When the tape T, on which the PCM audio signal is re-recorded as mentioned above, is desired reproduced, the ID signal is detected by the ID signal detecting circuit 23 at the timing shown in FIG. 4J and the demodulated audio signal is muted by the detected ID signal over the range shown in FIG. 4K. In other words, the demodulated audio signal based upon the reproduced signal from the track $a_{13}$ is muted.

As described above, the re-recording and demodulation of the PCM audio signal are carried out. According to the present invention, if the ID signal is recorded on, for example, the last track of the re-recording, it is possible that the ID signal is detected upon the reproduction and demodulation and the reproduced signal from the track, which is deteriorated upon the re-recording, is muted by the detected ID signal. Thus, generation of noises owing to the above deterioration can be positively avoided by the invention.

According to the invention, it is of no need that the track on which the ID signal is recorded is limited to the last track, but the ID signal may be recorded on a track before a predetermined track by n (positive integer). In the latter case, as the method to record the ID signal such a method may be considered in addition to the method which makes all of the recording period as a specific signal which can not be PCM-demodulated as set forth above, that the ID signal is inserted into a part of the PCM data, the frequency of a clock signal provided at the beginning of the PCM data is varied, a specific low frequency signal is superimposed on all the PCM data or the like.

By the fact that the ID signal is provided at the beginning of the re-recording, generation of noises due to the lack of coincidence of the head with the track at the beginning side can be avoided. That is, when the PCM recording is carried out, from the reproduction of the PCM audio signal to the demodulation of the audio signal, there is a delay time longer than one vertical period. Therefore, it is possible that the ID signal is recorded on the first track of the re-recording awnd so on and the PCM demodulated signal from a track before the former can be muted.

Further, this invention, in an alternate embodiment can be applied to such a case that each of tracks is separated into multiple segments, a separate PCM signal is recorded in each segment and the re-recording is carried out for only one desired segment.

The above-mentioned ID signal can be utilized as a timing signal when a re-recorded signal is recorded in a segment following the segment or segments in which re-recording has already been performed. In such an instance, the junction between audio signals or sounds from the re-recorded segments becomes very smooth.

In the above example of the invention, the muting may be a so-called soft muting or zero-cross muting.

The above description is given on a single preferred embodiment of the invention, but it will be apparent that many modifications and variations could be effected by one skilled in the art without departing from the spirit or scope of the novel concepts of the invention, so that the scope of the invention should be determined by the appended claims only.

We claim as our invention:

1. A magnetic recording and/or reproducing apparatus having at least a pair of rotary magnetic transducing heads for producing information tracks on a magnetic recording medium, each of said information tracks comprising a video signal track portion and an audio signal track portion, said transducing heads having respective azimuth angles which are different from each other and a width of said transducing heads being larger than that of said information tracks, comprising:
    means for re-recording an audio signal in substantial positional correlation with a recorded audio signal track portion,
    means for generating a non-audio identification signal for identifying re-recorded audio track portions,
    means for recording said identification signal in said audio track portion of an information track on said magnetic recording medium in lieu of said audio signal,
    means for detecting said identification signal, and
    means for compensating a reproduced audio signal in response to said identification signal.

2. An apparatus according to claim 1, in which said audio signal is a pulse code modulation (PCM) audio signal.

3. A magnetic recording and/or reproducing apparatus having at least a pair of rotary magnetic transducing heads for producing information tracks on a magnetic recording medium, each of said information tracks comprising a video signal track portion and an audio signal track portion, said transducing heads having respective azimuth angles which are different from each other and a width of said transducing heads being larger than that of said information tracks, comprising:
    means for re-recording an audio signal in substantial position correlation with a recorded audio signal track portion;
    means for generating an identification signal for identifying re-recorded audio track portions;
    means for recording said identification signal in a predetermined position on said magnetic recording medium;
    means for detecting said identification signal; and
    muting means for muting a reproduced audio signal in response to detecting said identification signal.

4. An apparatus according to claim 3, in which said muting means mutes an audio signal reproduced from an audio track located after a last re-recorded audio track.

5. Apparatus for re-recording audio signals of the kind having at least two rotary magnetic transducing heads for recording/reproducing information tracks on a magnetic recording medium, each information track including a video signal track portion and an audio signal track portion, comprising:
    means for re-recording audio signals in re-recorded audio signal tracks arranged in substantial positional correlation with a selected number of said recorded audio signal tracks;
    means for generating re-recorded track identification signals;
    means for recording said re-recorded track identification signals in at least one location on said magnetic recording medium in response to the location of said re-recorded audio signal tracks on said magnetic recording medium;
    means for detecting said re-recorded track identification signals during reproduction of the information tracks recorded on said magnetic record medium and for producing an identification detection signal during detection of said re-recorded track identification signals; and
    compensating means connected to receive said identification detection signal for compensating reproduced audio signals during the occurrence of said identification detection signal.

6. Apparatus according to claim 5, in which said compensating means comprises audio muting means connected to mute the reproduced audio signals during the occurrence of said identification detection signal.

7. Apparatus according to claim 5, in which said means for generating re-recorded track identification signals includes means for forming said re-recorded track identification signal so as not to be demodulated during demodulation of the recorded audio signal track portion.

8. Apparatus according to claim 5, in which said means for recording said re-recorded track identification signals include means for recording said re-recorded track identification signal on said magnetic record medium at a location corresponding to a last one of said re-recorded audio signal tracks.

9. Apparatus according to claim 8, further including means for recording said re-recording track identification signal on said magnetic recorded medium at a location corresponding to a first one of said re-recorded audio signal tracks.

* * * * *